Patented Nov. 26, 1940

2,222,734

UNITED STATES PATENT OFFICE 2,222,734

PEPTIZED PHOSPHATIC FERTILIZER

Wilder D. Bancroft, James K. Wilson, and John E. Rutzler, Jr., Ithaca, N. Y.

No Drawing. Application November 28, 1936, Serial No. 113,254

6 Claims. (Cl. 71—27)

Our invention relates to methods of making insoluble phosphatic materials available for plant growth, and to the materials themselves in their converted, available form.

Phosphatic material, such as the ordinary tricalcium phosphate carriers, contain a valuable plant nutrient in the form of phosphorus, but under ordinary conditions tricalcium phosphate is not available to plants. This non-availability of the phosphorus in ordinary phosphate rock, tricalcium phosphate, Thomas slag, guano and the like, which are largely tricalcium phosphate, has made necessary the acid treatment wherein tricalcium phosphate is converted by a strong acid, such as sulphuric, to forms available for plants. The process produces either the water soluble form, such as monocalcium phosphate, or the slightly water soluble form, dicalcium phosphate, which is somewhat available to plants and is ordinarily designated as citrate soluble.

It is an object of our invention to make available the phosphorus in tricalcium phosphate or other insoluble phosphatic material, such as rock phosphate, guano, Thomas slag, calcium metaphosphate, ferric, aluminum, calcium and magnesium phosphates and the like, without treating these materials by expensive processes, and without subjecting them to chemical decomposition.

Further objects of our invention are to provide a fertilizer in which the phosphorus is in readily available form for plants over a considerable range of depth in the soil, and which will retain its availability under varying soil and weather conditions, and also a product, the phosphorus of which becomes available after application to the soil.

With these and other objects in view, which will be readily apparent from the ensuing description, our invention comprises the steps hereinafter set forth, and the products resulting from the steps enumerated.

Our invention may comprise in part the treating of insoluble phosphatic material to bring it to the colloidal state in the presence of means which will tend to keep it in its colloidal dispersion in the soil for some time after its application to the soil. The very finely divided peptized particles of insoluble phosphatic material will supply to the soil solution more phosphate ions than the same material in bulk. This phosphorus in solution is necessary for plant growth.

We have found that preparing insoluble phosphatic material, such as tricalcium phosphate, so that it becomes peptized in the soil solution, produces excellent results, and the preparation of this material for peptization in the soil is the preferred form of our invention. A colloid may also be obtained by a metathetical reaction, such, for instance, as occurs when a soluble iron, magnesium, calcium or aluminum salt reacts with a soluble alkali phosphate in the presence of water to precipitate an insoluble magnesium, calcium, iron or aluminum phosphate. Here again the precipitate must be kept from coagulation by a protective colloid or by, for instance, the action of a soluble peptizing agent such as an amine. Another way of forming the colloid is by what may be called a mechano-chemical disintegration where an amine may be used together with the action of a colloid mill to obtain colloidal insoluble phosphatic material. As before stated, the soil peptization process is in some respects the most desirable. An example of this type of process is one in which finely ground insoluble phosphatic material, such as rock phosphate or tricalcium phosphate ground to 200 mesh, is mixed with from three percent up to a quantity which when applied to the soil mixed with the phosphatic material will be toxic to plants of an amine, such as triethanolamine, or diaminoisopropanol, or triethylamine, nicotine, tetraethylammonium hydroxide, morpholine and morpholine derivatives, or piperazine or derivatives of these or other nitrogenous bases. We have found ethanol amines to be good peptizing agents.

Often a soil will contain an insoluble phosphatic material which is not available for plant growth, and in this case the mere addition of the amine in water solution, for instance, to the soil, or in combination with some other non-phosphorus-containing fertilizer will cause the peptization of the insoluble phosphatic material in the soil, producing excellent results in plant growth without the expense of adding any phosphatic material to the soil. In this last type of process any one of the seven above identified amines will product good results under ordinary conditions. For instance, we may mix a material such as potassium nitrate with the amine in water and sprinkle this solution on the soil; the soil, it is to be understood, already having the insoluble phosphatic material in it. Also we may mix the amine in dry form with lime or limestone and a nitrogenous fertilizer constituent, such as sodium nitrate. This powdered mixture is sprinkled on the soil and the rain water dissolves the amine and nitrate, and carries the lime into the soil. The amine peptizes the insoluble phosphatic material in the soil and the other fertilizer constitutents are available to the plant along with the peptized phosphatic material.

Since either substances in true solution or protective colloids may act as peptizing agents, we clearly distinguish between the two when using the term soluble peptizing agent. We mean by soluble peptizing agent a substance, such as an amine for example, which is in true solution and which will pass through a suitable ultrafiltration membrane, which membrane will not allow nuclear gold, litmus or dextrin sols or any one of them to pass through it. This invention is restricted to soluble peptizing agents as defined above, such as amines, and/or to combinations of such soluble peptizing agents and protective colloids, said protective colloids being unable to pass through the above-mentioned ultrafiltration membrane. For the sake of clarity we cite the following few examples of peptization by a soluble peptizing agent, the soluble peptizing agent being named last in each case: tricalcium phosphate by an amine; clay by ammonia; silver bromide by potassium bromide; silver acetic acid; albumin by sodium thiocyanate; calcium silicate, silver chromate and silver chloride by sugar; hydrous ferric oxide by invert sugar; casein by alkalies. On the other hand, we give, for illustration, the following few examples of protective colloids, the protective colloid being named last: tricalcium phosphate by gelatin, starch or lignin; silver bromide by gelatin; cadmium sulphide by casein; mercurous chloride by albumin; metals by protalbinate or lysalbinate; carbon by tannin and ferric oxide.

Our experiments indicate that it is the hydroxyl ion resulting from the solution of the amine which causes the peptization of the phosphatic material, such as tricalcium phosphate, ferric phosphate, aluminum phosphate, dicalcium phosphate, calcium metaphosphate, rock phosphate, guano, Thomas slag and the like. The effect of the amine cation is a negative one in a sense in that it is desirable to use that amine which will give rise to an amine cation having a low coagulating power; so that we prefer to use a water soluble amine which gives rise to a high hydroxyl ion concentration and at the same time supplies an innocuous amine cation. The seven amines above named are amines of the desired type.

A colloid of the insoluble phosphatic material may be formed by a metathetical reaction, such as where soluble iron, magnesium, calcium or aluminum salts, such as magnesium, calcium, aluminum or iron chlorides, sulphates or nitrates, are mixed in water solution and added to the water solution of an alkali phosphate under proper precipitating conditions. The precipitate will be a magnesium, calcium, aluminum or iron phosphate. The precipitate can be prevented from coalescing and settling out by an amine or by a protective colloid, such as gelatin, starch or lignin. The magnesium, calcium, aluminum or iron phosphate remains in a colloidal state in the solution and can be distributed over the land to increase plant growth.

As an alternate form of process we employ a mechano-chemical disintegration in which, for instance, tricalcium phosphate may be subjected to the disintegrating action of a colloid or ball mill in the presence of an amine having a peptizing effect, whereby the effect of both the amine and the colloid or ball mill supplement each other, resulting in the expenditure of less power in preparing the colloid. In this connection it is to be realized that where by fine grinding or the action of a colloid or ball mill a colloid in which the internal phase is insoluble phosphatic material is produced, the addition of an amine will prevent coagulation of the solid material of the colloid. Thus a protective colloid, such as gelatin, starch or lignin, is not necessary where a soluble peptizing agent such as an amine is employed. The concentration of amine which is necessary to prevent coagulation is of course considerably less than the concentration employed to effect peptizing where the insoluble phosphatic material is not in an extremely finely divided state before the addition of the amine.

It has been found by us to be advantageous to employ in certain instances both a protective colloid and a soluble peptizing agent. For example, in rendering tricalcium phosphate available for plant growth we may employ a soluble peptizing agent, such as triethanolamine, or some of the other amines mentioned herein, and also a protective colloid, such as colloidal humin, alkali salts of humic acid, tannin, or salts of lysalbinic acid, etc.

These processes herein described, and particularly the processes employing peptization, enable phosphatic material to be employed for fertilizing purposes of much lower grade than is at present commercially feasible.

Five examples of procedures which will accomplish the desired result of making the phosphorus in substantially insoluble phosphates, or phosphatic materials, available for plant growth will now be given. These examples are by way of illustration only, it being clearly understood that there are equivalent methods which will be obvious to those skilled in the art.

*Example I*

This is an example of the preparation of a composition comprising an insoluble phosphatic material and a suitable amine, which composition results in peptized phosphatic material after application to the soil. As a suitable amine we may employ, for example, piperazine, triethanolamine, diaminoisopropanol, triethylamine, nicotine, tetraethylammonium hydroxide, morpholine, morpholine derivatives, or any other amine which will give rise to a considerable concentration of hydroxyl ions and a non-coagulating or slightly coagulating amine cation in the soil solution. As insoluble phosphatic material we may employ, for example, tricalcium phosphate, dicalcium phosphate, iron phosphate, magnesium phosphate or aluminum phosphate. Or we may employ a mixture of these phosphates in a fairly pure form or in the form of rock phosphate of a high or inferior grade as judged by the standards of the day. Thomas slag, guano and other phosphatic materials, such as calcium metaphosphate, may be used.

It is only necessary to grind these materials to a fine state of subdivision so that they will pass through a 200 mesh sieve, for instance. Clearly, any of the ordinary industrial grinding methods will serve for this purpose. The more finely divided the material is, the more effective will the amine be as a peptizing or solubilizing agent when the composition goes into the soil. From our experiments, there does not appear to be any critical particle size below which or above which the amine fails entirely to produce a peptizable composition. The amine may be incorporated with the insoluble phosphatic material in any one of several ways. For instance, it may be intimately mixed during grinding by the addition of the desired amount to the grinding machine along with the charge of phosphatic material, all in the dry state. Or, if wet grinding is employed, the liquid used may be a water solution containing the desired amount of amine.

Alternatively, the phosphatic material may be mixed while in a dry condition with the substance which is to bring about peptization after said phosphatic material has been finely ground. There are numerous well-known methods for accomplishing this.

Again, we may prefer to mix finely ground phosphatic material with a solution of the soluble peptizing agent. This may be done in several ways, which are familiar to those skilled in the art. Furthermore, the soluble peptizing material may be incorporated with the phosphatic material at any one of several times. For instance, they may be mixed either immediately after grinding, or when bagging the phosphatic material for sale, or by atomizing a solution of the amine into the phosphatic material at some stage of its handling on the farm.

In our processes and compositions we prefer to use an amount of peptizing amine equivalent to from one to ten percent of the weight of the phosphatic materials. Here there appear to be three factors which limit the amount of amine or peptizing agent which is effective. First, too little amine will not bring about enough peptization of the phosphatic material in the soil. Secondly, too much amine will be toxic to the plant. And thirdly, as the concentration of the amine increases the coagulating effect of the amine cation becomes greater. The bearing of each of these factors on the choice of amount of amine to use can be demonstrated easily for any amine, any phosphatic material and any plant. The amount of amine to be used will also be governed by the type of soil to which the composition is to be applied. That is to say, the more acid the soil, the more amine will be needed; and the higher the electrolyte content of the soil the more amine will be needed to accomplish the desired peptizing effect. Having shown that peptization of insoluble phosphatic materials by amines only requires an amine which is not highly toxic to plants in concentrations which will furnish a suitable hydroxyl ion concentration and which gives rise to an amine cation which has a weak coagulating effect, it becomes clear that this invention is not limited to any range of amounts of amines to be used.

We have also found that sodium and ammonium hydroxides peptize insoluble phosphatic materials. With these materials, however, the coagulating effects of the cations are very pronounced. This makes them considerably inferior as peptizing agents to the amines which we prefer to use. In preparing a composition comprising a phosphatic material and sodium or ammonium hydroxide we therefore find it necessary to use from 0.001 to 1% of the base based on the weight of the phosphatic material. Methods for the preparation of such compositions have been pointed out, as well as the factors upon which to base the amounts of the ingredients of the composition, these factors being qualitatively the same as those which govern the amount of an amine to be used.

*Example II*

This is an example of the preparation of colloidal composition suitable for use as a fertilizer which is produced by a condensation method making use of a metathetical reaction and an amine and/or a protective colloid. To prepare such a colloidal composition it is only necessary to mix solutions of a soluble phosphate and a soluble calcium magnesium, iron or aluminum salt in presence of an amine and/or a protective colloid. We may mix such quantities of a 25% solution of tri-sodium phosphate and a 50% solution of magnesium, calcium, aluminum or iron chloride as will precipitate the insoluble metallic phosphate without leaving an excess of the chloride salt used. The mixing is preferably done rapidly and at a temperature above 50° C., although the composition can be prepared at lower temperatures. To one or both of the solutions an amine and/or a protective colloid is added before or immediately after mixing them. Suitable amines for this purpose are those named and indicated ones given in Example I. The concentration of amine which is employed is preferably from one to ten percent of the weight of insoluble phosphate which will form during the reaction between the substances in the two solutions. As protective colloid we may use, for example, lignin, tannin, humus, starch or gelatin. The amount used will vary from approximately three to fifteen percent of the weight of the insoluble phosphate which is formed. The protective colloid may be added to either or both of the solutions before mixing. Alternatively, we may mix the two solutions in presence of both an amine and a protective colloid. In this case we use less amine and less protective colloid than when either is used alone. In place of trisodium phosphate we may use disodium, dipotassium or diammonium phosphate, and in place of the chloride mentioned we may use soluble sulphates, nitrates, acetates and the like.

Alternatively we may react orthophosphoric acid with an excess of calcium oxide, hydroxide or carbonate and add an amine at the end of the reaction, thus obtaining peptized tricalcium or dicalcium phosphate, or a mixture of the two. Or we may use an amine along with a protective colloid to bring about the peptization. As indicated before, other salts than calcium may be used. Another method of forming a colloid of an insoluble phosphatic material is to precipitate metacalcium phosphate, $Ca(PO_3)_2$ in presence of an amine. This colloid is prepared in a manner similar to that already described for the formation of colloidal tricalcium phosphate and dicalcium phosphate with the exception that a soluble salt of meta-phosphoric acid is used.

This procedure results in a colloidal form of an insoluble phosphate in which form the phosphorus can be utilized for plant growth. This fertilizer material may be applied to the soil in suspension in water. Or the suspension which is prepared as described may be evaporated to dryness or substantially to dryness and then applied to the soil. There are many familiar methods for carrying out this drying process as well as the mixing process already described. Drying should not be carried out at a high enough temperature to either sinter the insoluble phosphate or decompose the protective colloid or evaporate enough of the amine to greatly lessen its effectiveness.

*Example III*

We may prepare valuable fertilizer materials from insoluble phosphatic substances by what may be called mechano-chemical disintegration. By mechano-chemical disintegration we mean mechanical disintegration in presence of a chemical compound or substance which, by its peptizing action, aids in the disintegration to such an extent that the energy required for the mechanical breaking up of the particles is less than would be required in absence of the peptizing agent. For the purpose of preparing a composition by mechano-chemical disintegration we may take recourse to any one of several types of colloid mills or to a common ball mill for example. The process may be carried out in presence of water or in the case of an ordinary grinding mill, either in presence or absence of water. For instance, we may take a sample of rock phosphate of either inferior or superior grade Thomas slag, calcium metaphosphate, phosphatic guano or even higher grades of calcium, magnesium, iron or aluminum phosphate which has been ground previously to a size which is workable in the ball mill and place it in said mill. Then, to this material we may add enough of a water solution of a suitable amine such as was given in Example I, so that the amine is present in the proportion of from one-hundredth to one-half of the weight of the solid phosphatic material. The concentration of the water solution of the amine is so adjusted that there is just enough water present in the ball mill to wet the phosphatic material slightly. This mixture is then ground until when dry it will pass through a 200 mesh sieve. It may then either be dried and applied to the soil or applied to the soil as a mud or mixed with limestone and then applied. Alternatively, we may mix dry amine to the extent of from one percent up to a percentage which when applied to the soil with the phosphatic material will be toxic to the plants of the weights of the phosphatic material with said phosphatic material and grind to the required small particle size.

When a colloid mill is to be employed for the mechano-chemical disintegration a more dilute solution of the amine is used in accordance with the operating characteristics of such machines. However, the same proportion of amine to phosphatic material is used as when the grinding is done by a ball mill. The resulting product either may be applied to the soil as a slurry or it may be dried and applied.

Example IV

Instead of mixing an insoluble phosphatic material with an amine and applying the mixture to the soil we may make the mixture in the soil. For this purpose a finely ground, 200 mesh, for example, phosphatic material either of high or low grade is applied to the soil at the rate of from one hundred to eight hundred pounds per acre. A suitable amine or a combination of suitable amines is then applied to the soil in water solution by means of a spray, for example. In applying the amine we find that it is preferable to make the water solution of a concentration of less than fifty percent in order to ensure a uniform distribution over the land, although more concentrated solutions may be used. For this purpose we employ by preference an amount of amine not less than ten grams per one hundred square feet of land and not as much as will be toxic to the plant which is to be grown on the soil. The order of application of the phosphatic material and amine may be reversed if desired, but not by preference. Alternatively, we find it desirable to make a solution of a soluble fertilizer material such as potassium nitrate and add to such solution the proper amount of a suitable amine and apply the whole to the soil.

Example V

Since many soils contain natively an abundance of insoluble and therefore unavailable phosphatic materials, we prefer in such cases to apply a water solution of an amine or a water solution of an amine plus other soluble fertilizer materials to the soil in the manner and at the rate indicated in Example IV, without first or subsequently applying any phosphatic material whatever. In such soils as these it is often advisable to add lime or limestone. In that case we apply in solid form a fertilizer composition consisting of lime or limestone and a suitable amine to which may also be added nitrates and/or ammonium sulphate. The composition is prepared in any one of a number of ways such as are indicated in Example I. The amount of amine in the composition is so adjusted that when the composition is applied to the soil, said soil will contain from five grams up to an amount which will be toxic to the plants of amine per one hundred square feet.

It should be clearly understood that in our fertilizer compositions, or when our fertilizer compositions are put into water, the greater proportion of the phosphorus is not in true solution. It is in the form of a colloidal suspension. That is to say, the greater part of the phosphorus in these compositions when they are put into water is in such a combination and condition that it will not pass through the above-mentioned ultra-filtration membrane. Only the soluble phosphate which is formed due to solution and hydrolysis of the very finely divided particles will pass through said membrane; and this soluble phosphate is only a minor part of the total phosphorus in suspension. It should be understood also that when an amine is applied to the soil insoluble phosphates are peptized; but, as in the above case, by far the greater proportion of the phosphorus remains in a condition such that it will not pass through said membrane. On the other hand such compounds as sugar, sorbitol esters of meta-phosphoric acid or electrolytes which are in true solution in water and not in colloidal suspension will all pass through the above mentioned ultrafiltration membrane essentially quantitatively.

While we have described the preferred embodiment of our invention, we wish it to be understood that we do not confine ourselves to the precise details herein set forth by way of illustration, as it is apparent that many changes and variations may be made therein, by those skilled in the art, without departing from the spirit of the invention or exceeding the scope of the appended claims.

We claim:

1. A new fertilizer material comprising an insoluble phosphatic material and a soluble amine peptizing agent, the said amine forming from 1 to 10 percent by weight of the resulting mixture.

2. A new fertilizer comprising an insoluble phosphatic material and an amine peptizing agent, the said amine forming from 1 to 10 percent by weight of the resulting mixture.

3. The combination in a fertilizing material of iron phosphate and an amine peptizing agent, said amine forming from 1 to 10% by weight of the resulting mixture.

4. A fertilizing material comprising an insoluble phosphatic material, a soluble amine peptizing agent and a protective colloid, the said amine forming from 1 to 10 percent by weight of the resulting mixture.

5. The combination in a fertilizing material of tricalcium phosphate and an amine peptizing agent, said amine forming from 1 to 10% by weight of the resulting mixture.

6. The combination in a fertilizing material of agent, said amine forming from 1 to 10% by weight of the resulting mixture.

WILDER D. BANCROFT.
JAMES K. WILSON.
JOHN E. RUTZLER, Jr.